United States Patent
Grimm et al.

(10) Patent No.: US 7,144,077 B2
(45) Date of Patent: Dec. 5, 2006

(54) MECHANISM FOR A SUN ROOF

(75) Inventors: Rainer Grimm, Frankfurt (DE);
Thomas Becher, Rodgau (DE);
Richard Wagner, Mainz (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 11/043,834

(22) Filed: Jan. 26, 2005

(65) Prior Publication Data
US 2005/0173947 A1   Aug. 11, 2005

(30) Foreign Application Priority Data
Feb. 9, 2004   (DE)   ................. 20 2004 001 916 U

(51) Int. Cl.
*B60J 7/057* (2006.01)
*B60J 7/047* (2006.01)
(52) U.S. Cl. .................. 296/223; 296/216.03; 296/224
(58) Field of Classification Search ........... 296/216.03, 296/223, 224
See application file for complete search history.

(56) References Cited
U.S. PATENT DOCUMENTS

| | | | |
|---|---|---|---|
| 4,601,091 A | | 7/1986 | Grimm et al. |
| 4,725,092 A | * | 2/1988 | Reintges et al. ............ 296/221 |
| 4,982,995 A | | 1/1991 | Takahashi |
| 5,632,523 A | * | 5/1997 | Kelm ......................... 296/223 |
| 5,765,908 A | * | 6/1998 | Kelm ......................... 296/223 |
| 5,899,524 A | | 5/1999 | Mori et al. |
| 2003/0151275 A1 | | 8/2003 | Ohnishi et al. |

FOREIGN PATENT DOCUMENTS

DE   196 54 558 C2   11/1997

OTHER PUBLICATIONS

Austrian Search Report, Oct. 19, 2004.

* cited by examiner

*Primary Examiner*—Dennis H. Pedder
(74) *Attorney, Agent, or Firm*—Carlson, Gaskey, & Olds

(57) ABSTRACT

A mechanism for a sun roof has at least one guide rail, a lifting slide that can be moved along the guide rail, and a guide slide that can be locked in the guide rail in an initial position. The guide slide can be moved in the guide rail once the guide slide is unlocked. A cover holder is coupled to the lifting slide and the guide slide in such a way that the cover can be moved between a closed position and an opened position.

14 Claims, 4 Drawing Sheets

MECHANISM FOR A SUN ROOF

RELATED APPLICATIONS

This application claims priority to German Patent Application No. 202004 001 916.7, which was filed on Feb. 9, 2004.

BACKGROUND OF THE INVENTION

The invention relates to a mechanism for a sun roof in a vehicle.

Sun roofs typically include one or more movable covers that can be changed from a closed position, in which the movable covers close a vehicle roof opening, to an open position where the vehicle roof opening is open. The sun roof includes a mechanism that moves the movable covers through a number of intermediary positions With most mechanisms, in order to displace the movable covers, at least one slide is used that can be moved in a guide rail extending along the vehicle roof opening. By the interaction of the slide with the guide rail, a lifting movement is produced so that a position of the movable cover can be adjusted upwards. Additionally, interaction of the slide with the guide produces displacement movement. To achieve such movement, link guides are required that interact with at least one guide in the guide rail.

One disadvantage with this traditional mechanism is that guides in the guide rail have to run over a whole adjustment length of the movable cover. Another disadvantage is that such mechanisms require a lot of space. This is particularly critical because increased structural height of the mechanism means reduced head space in the vehicle.

A mechanism is shown in DE 37 15 268 that eliminates special guides within a guide rail. Instead, two slides are used in the guide rail, one of which can be locked in the guide rail. The disadvantage with this known structure is that it is only possible to provide a very small amount of lifting movement for the movable cover.

The aim of the invention is to create a mechanism for a sun roof that does not require any special guides within the guide rail, and which can provide a large amount of lifting movement for the cover.

SUMMARY OF THE INVENTION

In accordance with the invention, a mechanism for a sun roof is provided with at least one guide rail, one lifting slide that can be moved in the at least one guide rail, a guide slide that can be locked in the at least one guide rail in an initial position and can be moved in the at least one guide rail when unlocked, and a cover holder. The cover holder is joined with the lifting slide and the guide slide such that the cover holder can be adjusted between a closed position and an open position.

With the mechanism in accordance with the invention, the functions that are traditionally performed by guides in a guide rail, are now performed by the guide slide. A guide link is not stationary within the guide rail, as is the case with a conventional guide, but instead can be moved with the guide slide in the guide rail. This makes it possible to move the guide slide right out of an open roof area when the cover holder is opened. Overall there is very little structural height, and this makes it possible to provide a large amount of head room in a vehicle fitted with a sun roof system utilizing the mechanism incorporating the subject invention.

These and other features of the present invention can be best understood from the following specification and drawings, the following of which is a brief description.

DETAILED DESCRIPTION OF THE PREFERRED EMBODIMENT

Figure 1:
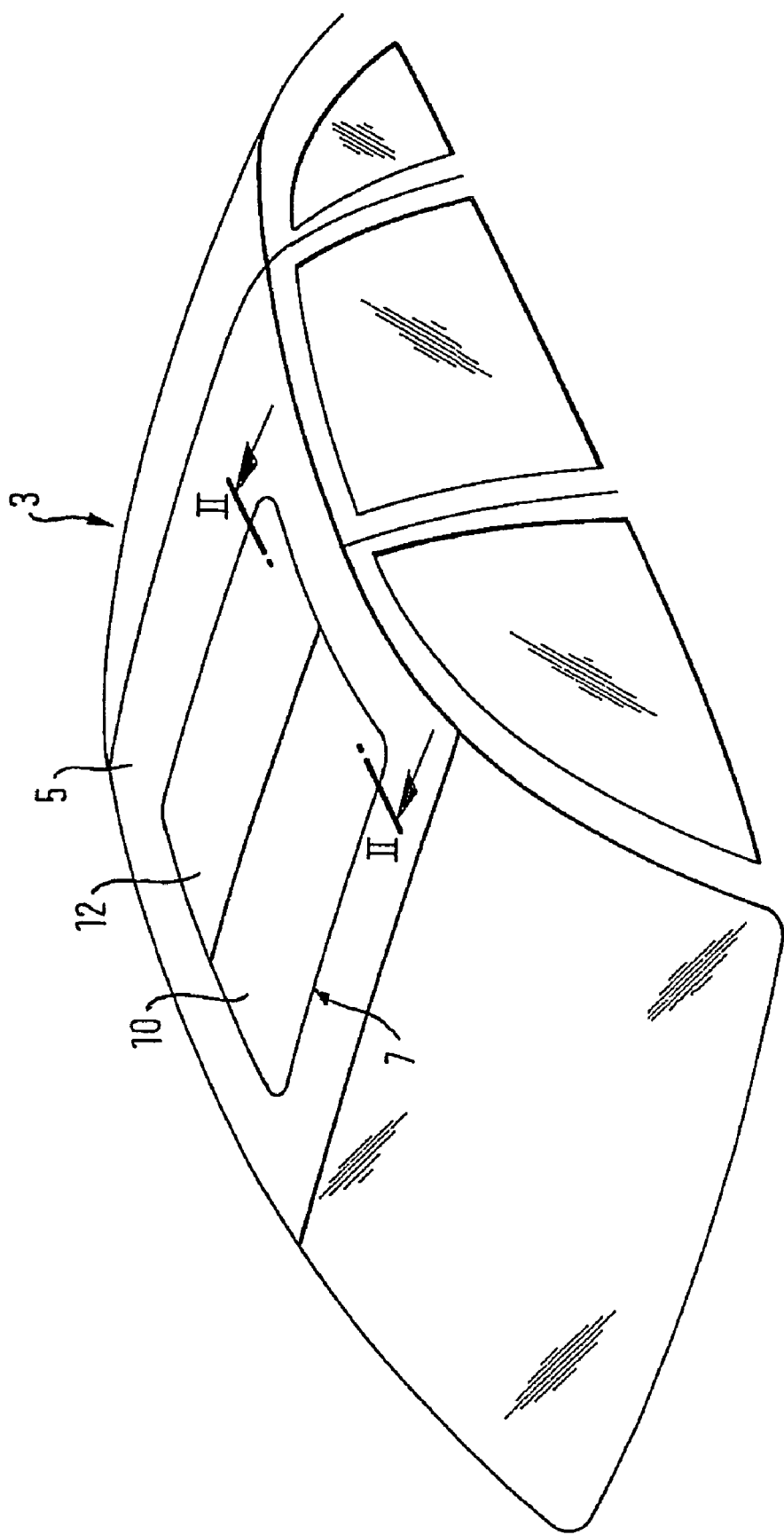
FIG. 1 shows a schematic perspective view of a vehicle roof having a sun roof system.

FIG. 1 schematically shows a vehicle roof 3 that has a roof skin 5. In the roof skin 5 there is a roof opening 7 that is closed by two covers 10, 12 of a sun roof system. The covers 10, 12 can be made from an optically transparent material or also from an opaque material. The covers 10, 12 are initially in a closed position shown in FIG. 1, and can be moved rearwards in relation to a vehicle, i.e., upwards and to the right as shown by FIG. 1, to an open position.

Figure 2:
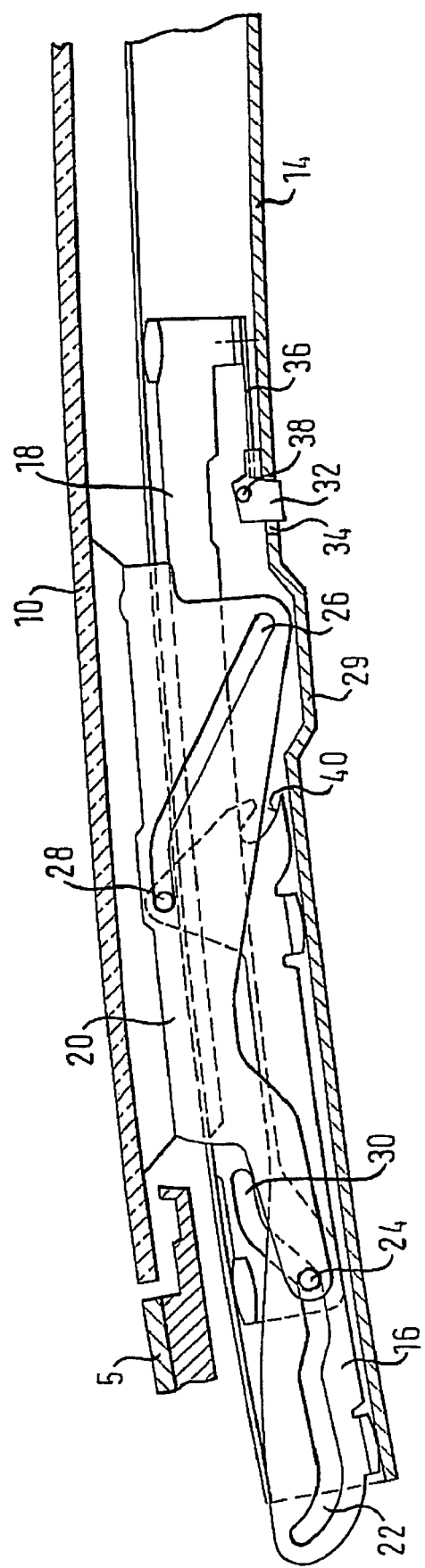
FIG. 2 shows a mechanism in an initial position in a side view, partially as a section, along the line II—II of FIG. 1.

In FIG. 2, essential components of the sun roof system are shown in a side view. In particular, FIG. 2 shows components of a mechanism for positioning the cover 10. The mechanism has a guide rail 14 that generally extends lengthwise along the vehicle along an edge of the roof opening 7. A similar guide rail is also provided on an opposite side of the roof opening 7. A movable lifting slide 16 is located in the guide rail 14. There is also a guide slide 18 in the guide rail 14. Joined to the lifting slide 16 and the guide slide 18 is a cover holder 20, which is securely fastened to the cover 10.

The lifting slide 16 is connected to the cover holder 20 by a release link guide and a lifting link guide. The release link guide includes a release link 22 positioned in the lifting slide 16. A release pin 24 engages the release link 22, and is located at a front end of a cover holder 20 when looking along the length of the vehicle. Seen from the rear towards the front, the release link 22 first extends parallel to a direction of the guide rail 14, then upwards a little, and then parallel again to the direction of the guide rail 14, and finally upwards again in a curved section.

The lifting link guide includes a lifting link 26 that is included within the cover holder 20. Seen from the front towards the rear, the lifting link 26 first extends parallel to the direction of the guide rail 14 and then slopes downwards. A lifting pin 28, which is located on a rear end of the lifting slide 16, as seen along the length of the vehicle, engages in the lifting link 26. The guide rail 14 is provided with an indentation 29 into which a lower section of the cover holder 20 can be received, and in which the lifting link 26 ends when the cover holder 20 is in the closed position.

An adjustment device (not shown) engages on the lifting slide 16. One example of an adjustment device is a cable that can transfer a thrust force, and which can be adjusted in a known way by a drive motor. In this example, the lifting slide 16 is translated along the guide rail 14.

The guide slide 18 is joined to the cover holder 20 by a guide link guide. The guide link guide has a guide link 30 that is located on a front end of the guide slide 18, as seen along the length of the vehicle. As seen from front to rear, the guide link 30 extends initially up an incline and ends parallel to the direction of the guide rail 14. A guide pin engages in the guide link 30. In the example shown, the guide pin is the same pin as the release pin 24, by means of which the cover holder 20 is joined to the release link 22 of the lifting slide 16. At a rear end, as seen along the length of the vehicle, the guide slide 18 is provided with a bolt 32, which interacts with a recess 34 in the guide rail 14. The bolt 32 is located on the guide slide 18 by means of a flat spring 36, which acts upon the bolt 32 in the position shown in FIG. 2, i.e., into the recess 34. An unlocking pin 38 is provided on the bolt 32, which interacts with an unlocking link 40, in the form of a groove. The unlocking link 40 is located on a rear end of the lifting slide 16 as seen along the length of the vehicle.

In FIG. 2, the mechanism is shown in an initial position in which the cover 10, which is activated by the mechanism, is in the closed position. The guide slide 18 is locked by the bolt 32 and the recess 34 so that the guide slide 18 remains stationary within the guide rail 14. The lifting slide 16 is in a position, having been pushed forwards along the length of the vehicle, in which the release pin 24 on the cover holder 20 is held by the release link 22 at the lower end of the guide link 30. In this way, both the release pin 24 and a front end of the cover holder 20 are safeguarded from movement along the length of the vehicle (namely from the guide link 30) and movement in the vertical direction (namely by means of the release link 22). At the rear end of the lifting slide 16, the cover holder 20 is also locked against movement in the vertical direction, namely by means of the lifting pin 28 that engages in a front upper section of the lifting link 26.

Figure 3:
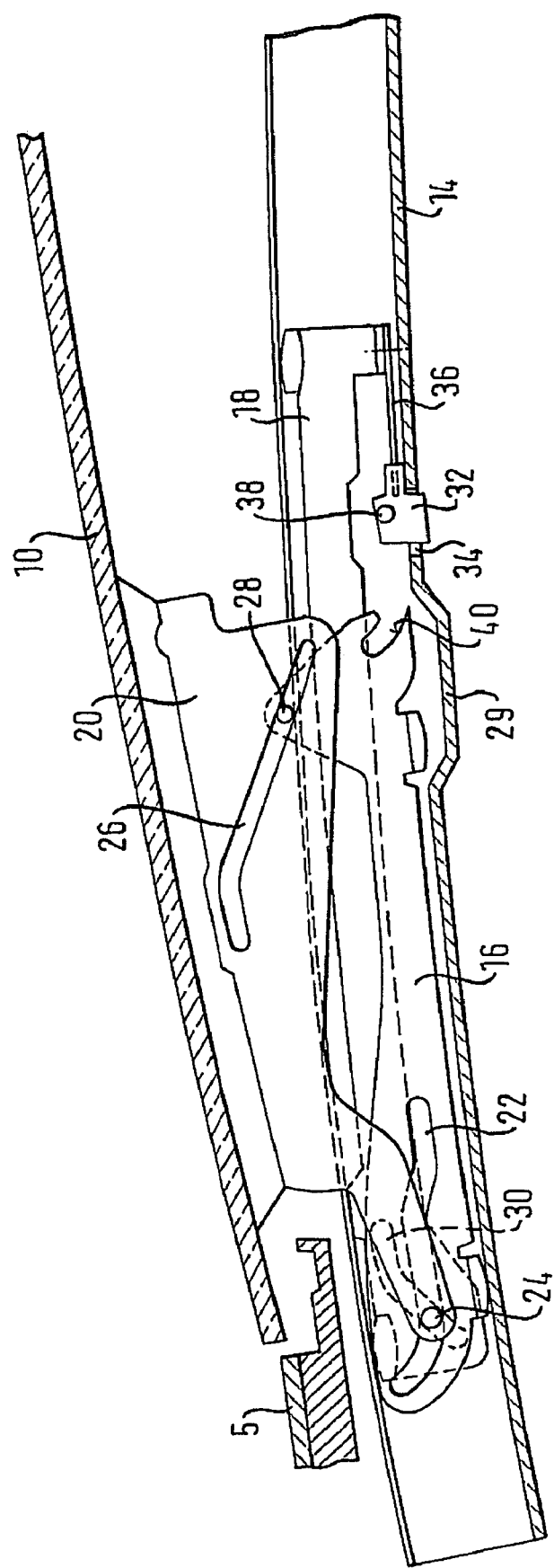
FIG. 3 shows the mechanism in a partially open state in a view corresponding to that of FIG. 2.

If the cover 10 is to be opened, the lifting slide 16 is first moved rearwards a little, i.e., to the right in relation to the position shown in FIG. 2. In this way, the cover 10 reaches an intermediary position shown in FIG. 3. The intermediary position is characterized in that the cover 10 is essentially only slightly lifted on a front edge, so that the cover 10 is separated from the roof skin 5, and is lifted much more at a rear end, so the cover 10 will be able to slide over another cover 12, for example; or so that the cover 10 can be placed in a ventilation position. In the intermediary position, the release pin 24 is positioned at an end of a central section of the release link 22. Thus, the release pin 24 has therefore been slightly raised in relation to an initial position of the release pin 24. This leads to a slight displacement of the cover holder 20 rearwards because the release pin 24 slides up an incline and rearwards in the guide link 30. The lifting pin 28 is located in an inclined section of the lifting link 26. The guide slide 18 remains in the initial position established by FIG. 2.

Figure 4:
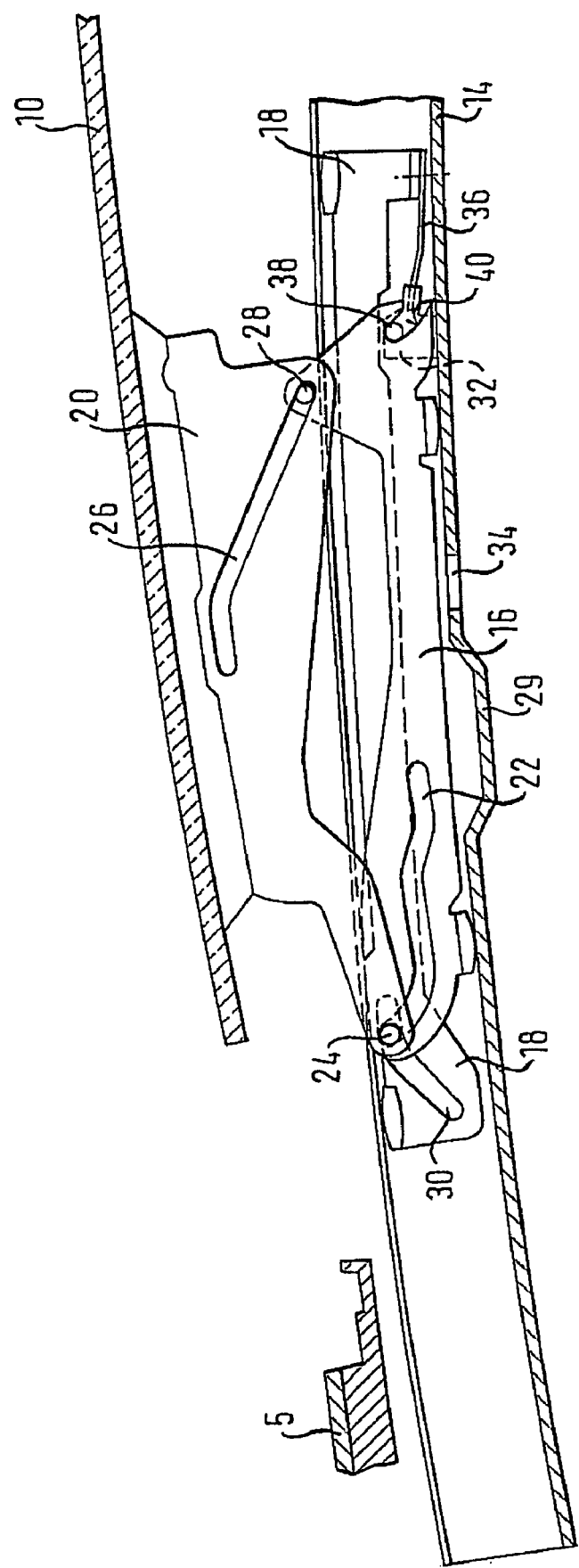
FIG. 4 shows the mechanism in a fully open position in a view corresponding to that of FIG. 2.

If the lifting slide 16 is to be pushed further back in the guide rail 14, the cover 10 is first positioned fully outwards, i.e., raised. This can be seen in FIG. 4 where the release pin 24 is located in upper sections of both the release link 22 and the guide link 30, and where the lifting pin 28 is located at a lower end of the lifting link 26. This state is reached at more or less the same time as when the lifting slide 16 engages the unlocking link 40 on the unlocking pin 38 of the bolt 32 and pushes the bolt 32 upwards from the recess 34. In this way, the guide slide 18 can be moved in the guide rail 14, and it is conveyed from the lifting slide 16 in the guide rail 14. This state is shown in FIG. 4.

The cover 10 can now be moved rearwardly in relation to the length of the vehicle, into the fully open position. In order to close the cover 10, the lifting slide 16 is pushed in an opposite direction along the guide rail 14, i.e., forwards. In so doing, the lifting slide 16 takes the unlocking pin 38, the bolt 32, the flat spring 36 and the guide slide 18 with it over the unlocking link 40 until the lifting slide 16 has returned to the initial position in which the bolt 32 engages in the recess 34. Before reaching the initial position, the bolt 32 can not deviate downwards so that the bolt 32 remains hooked in the unlocking link 40 by means of the unlocking pin 38. As soon as the bolt 32 is locked once again in the recess 34, the cover 10 can be positioned back in the closed position by pushing the lifting slide 16 further forwards in the guide rail 14.

The mechanism described is characterized by a simple structure of the guide rail 14. It is not necessary to provide the guide rail with guides for pins of a link guide. The corresponding guides are provided exclusively in the comparatively short components, lifting slides, guide slides and cover holder. These components can, for example, be punched or injection molded. It can also be seen that the guide rail 14, and correspondingly the whole mechanism, is very compact in structure vertically. The lifting movement achievable with the lifting link 26 is greater than the height of the guide rail 14 (apart from where the indentation 29 is located).

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mechanism for a sun roof comprising:
   at least one guide rail;
   a lifting slide movable in the at least one guide rail;
   a guide slide accommodated slideably in the at least one guide rail and arranged rearwardly of the lifting slide, the guide slide having a locked position where the guide slide is held fixed relative to the at least one guide rail and an unlocked position where the guide slide is moved along the at least one guide rail; and
   a cover holder coupled to the lifting slide and the guide slide such that the cover holder is selectively movable between a closed position and an opened position, wherein the lifting slide is associated with a front end of the cover holder, and wherein the cover holder and the lifting slide are connected to one another with a lifting link guide.

2. The mechanism in accordance with claim 1, wherein the cover holder and the lifting slide are connected to one another with a release link guide.

3. The mechanism in accordance with claim 2, including a release pin on the cover holder wherein the lifting slide has a release link that engages the release pin.

4. The mechanism in accordance with claim 1, including a lifting pin on the lifting slide wherein the cover holder has a lifting link that engages the lifting pin.

5. The mechanism for a sun roof comprising:
   at least one guide rail;
   a lifting slide movable in the at least one guide rail;
   a guide slide having a locked position where the guide slide is held fixed relative to the at least one guide rail and an unlocked position where the guide slide is moved along the at least one guide rail;
   a cover holder coupled to the lifting slide and the guide slide such that the cover holder is selectively movable between a closed position and an opened position, wherein the lifting slide is associated with a front end of the cover holder, and wherein the cover holder and the lifting slide are connected to one another with a lifting link guide; and a lifting pin on the lifting slide wherein the cover holder has a lifting link that engages the lifting pin and wherein the at least one guide rail has an indentation that receives a lower end section of the cover holder when in the closed position, and wherein an end of the lifting link is aligned with the indentation when the cover holder is in the closed position.

6. The mechanism in accordance with claim 1, wherein the guide slide and the cover holder are connected to one another with a guide link guide.

7. The mechanism in accordance with claim 6, including a guide pin on the cover holder wherein the guide slide has a guide link that engages the guide pin.

8. The mechanism in accordance with and claim 7, wherein the cover holder and the lifting slide are connected to one another with a release link guide, and including a release pin on the cover holder wherein the lifting slide has a release link that engages the release pin and wherein the guide pin and the release pin are the same pin.

9. The mechanism in accordance with claim 1, wherein the guide slide includes a bolt that is engageable in a recess in the at least one guide rail.

10. The mechanism in accordance with claim 9, wherein the lifting slide includes an unlocking link that engages the bolt.

11. A mechanism for a sun roof comprising:
at least one guide rail;
a lifting slide movable in the at least one guide rail;
a guide slide having a locked position where the guide slide is held fixed relative to the at least one guide rail and an unlocked position where the guide slide is moved along the at least one guide rail, and wherein the guide slide includes a bolt that is engageable in a recess in the at least one guide rail, the bolt having an unlocking pin that engages the lifting slide; and
a cover holder coupled to the lifting slide and the guide slide such that the cover holder is selectively movable between a closed position and an opened position.

12. A mechanism for a sun roof comprising:
at least one guide rail;
a lifting slide movable in the at least one guide rail;
a guide slide having a locked position where the guide slide is held fixed relative to the at least one guide rail and an unlocked position where the guide slide is moved along the at least one guide rail, and wherein the guide slide includes a bolt that is engageable in a recess in the at least one guide rail, the bolt having a flat spring that connects the bolt to the guide slide and which causes the bolt to locate in the recess; and
a cover holder coupled to the lifting slide and the guide slide such that the cover holder is selectively movable between a closed position and an opened position.

13. The mechanism in accordance with claim 1, wherein the lifting slide is connected to the cover holder by a release link positioned in the lifting slide and a release pin that engages the release link, and wherein the release pin is located at the front end of the cover holder.

14. The mechanism in accordance with claim 1, wherein the lifting link guide includes a lifting link included within the cover holder and a lifting pin located on a rear end of the lifting slide that engages in the lifting link.

* * * * *

UNITED STATES PATENT AND TRADEMARK OFFICE
CERTIFICATE OF CORRECTION

PATENT NO. : 7,144,077 B2 Page 1 of 1
APPLICATION NO. : 11/043834
DATED : December 5, 2006
INVENTOR(S) : Grimm et al.

It is certified that error appears in the above-identified patent and that said Letters Patent is hereby corrected as shown below:

Claim 5, Column 4, line 57: "The" should be --A--

Signed and Sealed this

Twentieth Day of March, 2007

JON W. DUDAS
*Director of the United States Patent and Trademark Office*